UNITED STATES PATENT OFFICE.

ELIS OLSSON, OF EAST ANGUS, QUEBEC, CANADA.

RECOVERY PROCESS IN THE MANUFACTURE OF SULFATE PULP.

1,322,043. Specification of Letters Patent. Patented Nov. 18, 1919.

No Drawing. Application filed August 16, 1918. Serial No. 250,194.

*To all whom it may concern:*

Be it known that I, ELIS OLSSON, of the town of East Angus, Province of Quebec, Dominion of Canada, have invented certain new and useful Improvements in Recovery Processes in the Manufacture of Sulfate Pulp; and I do hereby declare that the following is a full, clear, and exact description thereof.

It may be explained that the weak liquor resulting from washing sulfate pulp and which is known as "black liquor" is treated in a special process for the purpose of recovering the chemicals essential to the manufacture of sulfate pulp and which would otherwise be lost. This black liquor consists mainly of sodium carbonate, lignate of sodium, water and organic matter. This liquor is evaporated as the recovering process is carried on. The final evaporation takes place while the mass is in a rotary furnace from which the evaporated liquor in a thick or semi-dry condition is discharged. This discharged substance is known as "black ash", and it is burned in a smelting furnace and the gases given off are collected for subsequent use.

Heretofore the losses made during this recovering process and in the preceding pulp manufacturing process were compensated for by mixing with the black ash the chemical substance known as "salt-cake" which was introduced into the smelting furnace where it was mixed with the black ash. The cake is sodium sulfate which was reduced to sodium sulfid by the chemical action of the organic substance in the black ash. The sodium sulfid is one of the main solvents in the cooking of the pulp, its purpose being to produce a clean long fiber pulp. I have discovered, however, that the yield of this process was not as great nor the fibers as strong as should be obtained. This defect is due to the fact that the old process provided for the addition of the salt cake to the black ash in the smelting furnace with the result that a relatively small amount of sodium sulfid was produced by this recovering process because no radical change was made in the recovered chemicals, the entire chemical action having taken place between the salt cake and the residue. To overcome this deficiency and provide a more efficient process is the object of my invention.

To this end I secure a radical change in the recovered chemicals by adding to the black liquor what is known to the trade as "niter-cake" which consists of from 60% to 65% sodium sulfate and about 30% sulfuric acid. By adding this niter-cake to the black liquor, part of the sodium carbonate of the black liquor is converted into sodium sulfate by the free acid in the niter-cake thereby developing a high percentage of this essential ingredient in the production of sodium sulfid from the black ash.

The mixing of the niter-cake with the black liquor may be done either in a separate apparatus or in the rotary furnace itself. I prefer to make the mixture in the rotary furnace.

The black ash obtained from this mixture contains no sulfuric acid, the sodium sulfate however, thoroughly permeates the black ash thereby rendering it capable of being more completely reduced. It may be explained that when using niter cake which, as before mentioned, has the chemical formula $NaHSO_4$, a greater percentage of sodium sulfid is obtained than is possible with salt cake which has the chemical formula $Na_2SO_4$. Sodium sulfate is an agent that acts as a mild solvent on the binding substances in the wood but does not attack the cellulose to the extent that sodium hydrate, the other main solvent in the cooking liquor, does. In other words, by using my process sodium hydrate is replaced to a greater extent with sodium sulfid in the cooking liquor. Another advantage is that the sodium sulfid formed in the smelting furnace does not require any lime which sodium carbonate does. By using the niter cake process, as before mentioned, part of the sodium carbonate is converted into sodium sulfid in the rotary furnace. This sodium carbonate would in the common sulfate process come through the smelting furnace unchanged and lime would have been required to convert it to sodium hydrate. This high percentage of sodium sulfid obtained by the use of the niter cake process causes a high yield of pulp by using this solvent which does not attack cellulose to the same extent as sodium hydrate. As a matter of fact a higher yield is obtained than with the common sulfate process.

The black liquor passes from the evaporator to the rotary furnace in which it is reduced to black or pitchy ash and fed in this state to the smelting furnace. According to my invention the niter-cake is charged into the rotary furnace and there reacts with the black liquor before the black ash is formed.

Although I have described my process as involving the addition of the NaHSO₄ to the black liquor in the rotary furnace it may be added to the black liquor at any step in the process and in any desired quantity to replace all or part of the losses due to the manufacture of the sulfate pulp, without departing from the spirit of my invention.

I do not claim cooking liquor having sodium sulfid as a predominant solvent, nor the replacing of sodium hydrate in the cooking liquor with sodium sulfid for the purpose of preserving cellulose during the cooking of the wood, as the same forms the subject matter of a separate application, filed April 2, 1919, under Serial No. 286,938.

What I claim is as follows:—

The recovery process in the manufacture of sulfate pulp in which the washing liquid, known as black liquor, is evaporated and the residuum burned, adding NaHSO₄ to the black liquor.

In testimony whereof I have signed my name to this specification in the presence of two witnesses.

ELIS OLSSON.

Witnesses:
E. A. MONTGOMERY,
S. C. STODDARD.